3,558,672
SYNTHESIS OF DL-19-NORPREGNA-4,16-
DIENE-3,20-DIONE
William S. Johnson, Portola Valley, Calif., and Sydney
Archer, Bethlehem, N.Y., assignors to Sterling Drug
Inc., New York, N.Y., a corporation of Delaware
No Drawing. Filed Aug. 5, 1968, Ser. No. 749,945
Int. Cl. C07c *169/22*
U.S. Cl. 260—397                    11 Claims

ABSTRACT OF THE DISCLOSURE

*dl*-19-norpregna-4,16-diene-3,20-dione, the racemate of a known steroid, is prepared as follows: 2-(7,11-dimethyl-trans,trans - dodeca-3,7,11-trienyl)-3-methylcyclopent-2-en-1-one is reduced to the corresponding 1-ol compound, the latter cyclized with a strong acid to yield *dl*-3,17-dimethyl-A-nor-D-homoestra-3,16-diene, which is ozonized to give 1α-(3-oxobutyl)-5β-formylmethyl-6α-(2-oxopropyl) - 6β - methyl-3,4,4aβ,5,6,7,8,8aα-octahydro-2(1H)-naphthalenone, and the latter cyclized with acid or base.

---

This invention relates to a new synthesis of *dl*-19-norpregna-4,16-diene-3,20-dione, and in particular is concerned with novel intermediates and process steps in said synthesis.

The synthesis is carried out in accordance with the following flow sheet:

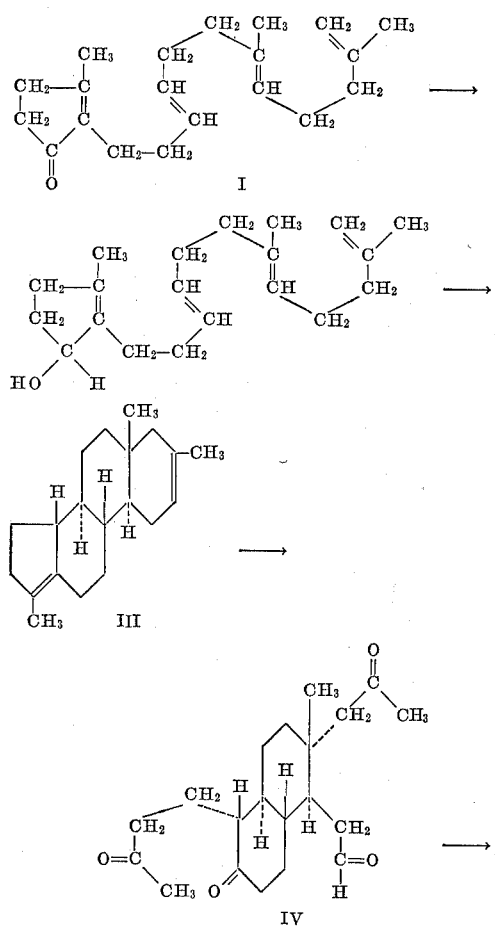

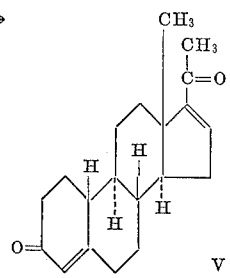

The preparation of the starting compound, 2-(7,11-dimethyl - trans,trans - dodeca-3,7,11-trienyl)-3-methylcyclopent-2-en-1-one (I) is described by W. S. Johnson, M. F. Semmelhack, M.U.S. Sultanbawa and L. A. Dolak in J. Am. Chem. Soc. 90, 2994–6 (1968).

According to the present invention, the unsaturated ketone (I) is reduced to the carbinol, 2-(7,11-dimethyl-trans,trans - dodeca-3,7,11-trienyl)-3-methylcyclopent-2-en-1-ol (II) by treating it with a metal hydride capable of reducing the oxo group without reducing the double bonds, or with an aluminum lower-alkoxide (Meerwein-Ponndorf-Verley reduction). Such metal hydride reducing agents include sodium borohydride, lithium aluminum hydride, lithium tri-t-butoxyaluminum hydride, potassium borohydride, sodium trimethoxyborohydride, lithium borohydride, and the like. The metal hydride reduction is carried out in an inert solvent at ordinary temperatures (0–30° C.). The aluminum lower-alkoxide reduction is carried out in a solvent comprising the lower-alkanol from which the alkoxide is derived at a temperature between about 50 and 150° C., conveniently at the reflux temperature of the solvent.

The carbinol II is then cyclized to the tetracyclic hydrocarbon (III), *dl*-3,17-dimethyl-A-nor-D-homoestra-3,16-diene, by treating the former with a strong acid. The cyclization reaction also produces, along with the diene III, some 17-hydroxy compound, *dl*-3,17-dimethyl-A-nor-D-homoestr-3-en-17-ol which can readily be dehydrated with phosphorus oxychloride in pyridine to yield III. The cyclization reaction is preferably carried out at a depressed temperature (−100–0° C.), conveniently at the temperature afforded by solid carbon dioxide (about −75° C.). The strong acid can be any strong acid appreciably soluble in the solvent at the temperature employed, for example, formic acid, trifluoroacetic acid, fluorosulfonic acid, fluoromethanesulfonic acid, and the like; and the solvent is preferably a non-nucleophilic solvent, for example, methylene dichloride, pentane, 1,2-dichloro-1,1,2,2-tetrafluoroethane, and the like.

The next step comprises ozonizing the diene III to produce the tetracarbonyl compound of Formula IV, namely 1α - (3 - oxobutyl) - 5β - formylmethyl - 6α - (2 - oxopropyl) - 6β - methyl - 3,4,4aβ,5,6,7,8,8aα - octahydro-2(1H)-naphthalenone. The term "ozonizing" or "ozonolysis" as used herein includes not only the treatment of compound III with ozone but also the decomposition of the intermediate ozonide. The diene III in an inert solvent is treated with ozone preferably at a depressed temperature (−100–0° C.), conveniently at the temperature afforded by solid carbon dioxide (about −75° C.). The resulting ozonide is not isolated but is decomposed by procedures known in the art, with reducing agents such as potassium ferrocyanide, sodium hydrosulfide, sulfur dioxide, zinc and acetic acid, and the like. The ozonide decomposition is carried out at room temperature or slightly above, conveniently in the same solvent in which the ozone treatment was performed.

Alternatively, the diene III can be converted to the tetracarbonyl compound IV by treating the former with excess osmium tetroxide in pyridine followed by cleavage of the bisosmate with hydrogen sulfide in dimethyl sulfoxide to give a tetrol which, without purification, is treated with excess lead tetraacetate to yield IV.

The tetracarbonyl compound IV need not be isolated and purified but can be converted directly to dl-19-norpregna-4,16-diene-3,20-dione by treating it with a cyclization catalyst. The cyclization catalyst comprises a strong acid (for example, hydrochloric acid, hydrobromic acid, fluoroacetic acid, and the like), a strong base (for example, sodium hydroxide, potassium hydroxide, and the like), an amine (for example, piperidine, triethylamine, and the like) or an amine acid-addition salt (for example, triethylammonium benzoate, triethylammonium acetate, and the like). The cyclization reaction is carried out by heating compound IV with the cyclization catalyst in aqueous or organic medium at a temperature between about 50° C. and 150° C.

The dl-19-norpregna-4,16-diene-3,20-dione produced as described above is identical in its infrared spectrum, NMR spectrum, mass spectrum, thin layer chromatographic analysis and gas-liquid phase chromatographic analysis with the corresponding spectra and analyses on d-19-norpregna-4,16-diene-3,20-dione, a known substance derived from naturally occurring steroids (U.S. Pats. 3,262,950 and 3,314,946), useful in the preparation of progestational agents. The optically inactive dl-form can, if desired, be resolved to its optically active enantiomers by known procedures.

The following examples will further illustrate the invention without the latter being limited thereby.

EXAMPLE 1

2-(7,11-dimethyl-trans,trans-dodeca-3,7,11-trienyl)-3-methylcyclopent-2-en-1-ol (II)

A solution of 250 mg. of 2-(7,11-dimethyl-trans,trans-dodeca - 3,7,11 - trienyl) - 3 - methylcyclopent - 2 - en - 1-one (I) in 10 ml. of absolute ethanol was treated at room temperature with 250 mg. of sodium borohydride in 2.5 ml. of water. The mixture was stirred for four and one-half hours, and then an additional 100 mg. of sodium borohydride was added. After one hour, 2 ml. of acetone and then water were added, and the mixture was extracted with ether. The ether extracts were washed with saturated sodium chloride solution, dried over anhydrous sodium sulfate and concentrated to remove the solvent, to give 250 mg. of 2-(7,11-dimethyl-trans,trans-dodeca-3,7,11-trienyl)-3-methylcyclopent-2-en-1-ol as a colorless liquid, B.P. 135–140° C. (0.002 mm.), $n_D^{25}=1.4959$; infrared peaks at 3620, 1650, 950 and 890 cm.$^{-1}$.

The same reaction can be carried out with compound I and lithium aluminum hydride in anhydrous ether; or lithium tri-t-butoxyaluminum hydride in tetrahydrofuran. I can also be converted to II by heating a solution of I with aluminum isopropoxide in isopropyl alcohol and removing the acetone formed by distillation.

EXAMPLE 2 dl-3,17-dimethyl-A-nor-D-homoestra-3,16-diene (III)

(a) A solution of 2 g. of 2-(7,11-dimethyl-trans,trans-dodeca - 3,7,11 - trienyl) - 3 - methylcyclopent - 2 - en - 1-ol in 1300 ml. of methylene chloride, maintained in an atmosphere of nitrogen, was cooled to −78° C. with a solid carbon dioxide-methylene dichloride cooling bath. The solution was stirred while 38 ml. of trifluoroacetic acid was added over a five minute period. The stirring was then stopped and the pink reaction mixture kept at −78° C. for eighteen hours. The reaction mixture was added to 700 ml. of saturated sodium bicarbonate solution. The layers were separated and the aqueous layer washed with a small volume of methylene dichloride. The methylene dichloride layers were combined and dried over anhydrous sodium sulfate, and the solvent was evaporated to afford 2.33 g. of oil. The latter was chromatographed on a column of 120 g. of activated magnesium silicate. The column was eluted first with pentane to give 430 mg. of dl-3,17-dimethyl-A-nor-D-homoestra-3,16-diene containing a small amount of the isomeric dl-3,17-dimethyl-A-nor-D-homoestra-3,17-diene; and then eluted with ether to give 1.57 g. of more polar material, containing dl - 3,17 - dimethyl - A - nor - D - homoestra - 3-en-17-ol. The latter material was dissolved in 20 ml. of dry pyridine, and the solution was treated with 2 ml. of phosphorus oxychloride. The reaction mixture was stirred overnight at room temperature and then added to 100 ml. of ether. Ice was cautiously added, followed by 100 ml. of water. The layers were separated, and the ether was washed with dilute hydrochloric acid, saturated sodium bicarbonate solution and saturated sodium chloride solution. The ether solution was dried over anhydrous sodium sulfate, and the solvent was evaporated to give 1.34 g. of residue which was chromatographed on 150 g. of activated magnesium silicate using pentane for elution. Another 350 mg. of tetracyclic material was obtained, combined with the 430 mg. obtained from the first chromatograph and recrystallized from ethanol to give 450 mg. of dl-3,17-dimethyl-A-nor-D-homoestra-3,16-diene, M.P. 72–74° C. A sample having the M.P. 78–80° C. was obtained from another run.

(b) Fluorosulfonic acid (5 ml.) was added to a stirred solution of 500 mg. of 2-(7,11-dimethyl-trans,trans-dodeca-3,7,11-trienyl)-3-methylcyclopent-2-en-1-ol in 300 ml. of methylene dichloride at −78° C., maintained in a nitrogen atmosphere. The reaction mixture was stirred overnight at −78° C. and then added to 200 ml. of saturated sodium bicarbonate solution. The layers were separated and the methylene dichloride layer washed with saturated sodium bicarbonate solution. The sodium bicarbonate solutions were back-washed with methylene dichloride. The combined methylene dichloride solutions were dried over anhydrous sodium sulfate and evaporated to remove the solvent. The residue was chromatographed on 40 g. of magnesium silicate and eluted with pentane, to give dl-3,17-dimethyl-A-nor-D-homoestra-3,16-diene, the presence of which was shown by thin layer chromatography.

EXAMPLE 3

1α-(3-oxobutyl)-5β-formylmethyl-6α-(2-oxopropyl)-6β-methyl-3,4,4aβ,5,6,7,8,8aα-octahydro-2(1H)-naphthalenone (IV)

A solution of 260 mg. of dl-3,17-dimethyl-A-nor-D-homoestra-3,16-diene in 40 ml. of methylene dichloride and 0.5 ml. of pyridine was cooled with stirring to −78° C. Ozone was bubbled through the solution until a blue color resulted. The solution was stirred for an additional fifteen minutes at −78° C. Zinc powder (500 mg.) and 2.5 ml. of acetic acid were then added, and the mixture was stirred and allowed to warm to room temperature over a half-hour period. The reaction mixture was washed with saturated sodium bicarbonate solution and with saturated sodium chloride solution, and the organic solution was dried over anhydrous sodium sulfate and evaporated. The residual oil (280 mg.) was dissolved in acetone, filtered, and the filtrate chromatographed on two 20 x 40 cm. silica gel plates (1 mm. thick). The plates were developed with ether, and the main fraction obtained thereby consisted of 1α-(3-oxobutyl)-5β-formylmethyl-6α-(2-oxopropyl) - 6β-methyl-3,4,4aβ,5,6,7,8,8aα-octahydro-2(1H)-naphthalenone; NMR peak at 580 (singlet, CHO); infrared peaks at 2720 (CHO) and 1710–30 (C=O) cm.$^{-1}$.

Compound IV can also be prepared by treating compound III with excess osmium tetroxide in pyridine for 48 hours at 24° C. followed by cleavage of the bisosmate with hydrogen sulfide in dimethyl sulfoxide to give a tetrol derivative of compound III, which tetrol is treated with excess lead tetraacetate in tetrahydrofuran at 0° C. for fifteen minutes to afford compound IV.

EXAMPLE 4 dl-19-norpregna-4,16-diene-3,20-dione (V)

A solution of 110 mg. of 1α-(3-oxobutyl)-5β-formylmethyl - 6α-(2-oxopropyl)-6β-methyl-3,4,4aβ,5,6,7,8,8aα-octa-hydro-2(1H)-naphthalenone in 27 ml. of a solution made from 30 ml. of acetic acid, 3 ml. of concentrated hydrochloric acid and 0.75 ml. of water was heated at reflux under nitrogen for two and one-half hours. The reaction mixture was evaporated to remove the solvent. The residue was dissolved in 300 ml. of ether and washed with saturated sodium bicarbonate solution and with saturated sodium chloride solution. The aqueous washings were back-extracted with ether, the combined ether solutions were dried over anhydrous sodium sulfate, and the solvent was evaporated to afford 105 mg. of a yellow oil that solidified. The latter was chromatographed on two 20 x 40 cm. silica gel plates (1 mm. thick), and the chromatogram was developed twice with ether. The main ultraviolet absorbing band was eluted and afforded 60 mg. of dl-19-norpregna-4,16-diene-3,20-dione, M.P. 139.5–142° C., which was recrystallized twice from ether to give a sample with M.P. 140–142° C.; ultraviolet maximum in ethanol at 240 mμ ($\epsilon$=26,800). The infrared spectrum in chloroform, the NMR spectrum, the mass spectrum, and thin layer chromatographic and gas-liquid phase chromatographic analyses were all identical to the corresponding measurements on a sample of d-19-norpregna-4,16-diene-3,20-dione [M.P. 180.5–182° C.; ultraviolet maximum in ethanol at 240 mμ ($\epsilon$=27,800); $[\alpha]_D^{25}$=+119.1° (1% in chloroform)], prepared as described in the prior art.

dl-19-norpregna-4,16-diene-3,20-dione can also be prepared by stirring 1α-(3-oxobutyl)-5β-formylmethyl-6α(2-oxopropyl) - 6β - methyl - 3,4,4aβ,5,6,7,8,8aα-octahydro-2(1H)-naphthalenone with 2.5% aqueous potassium hydroxide for thirteen hours at 75° C.

dl-19-norpregna-4,16-diene-3,20-dione can be resolved into the d- and l-forms by conversion to a hydrazone derivative with 1-methylhydrazine, separation of the disastereoisomeric forms, and reconversion of the hydrazones to the respective optically active ketones. The resolution can also be effected by stereo-selective microbiological reduction or by reduction with an optically active aluminum alkoxide, followed by oxidation of the resulting optically active steroid carbinols.

We claim:

1. 2-(7,11-dimethyl-trans, trans-dodeca-3,7,11-trienyl)-3-methylcyclopent-2-en-1-ol.

2. The process for preparing 2-(7,11-dimethyl-trans, trans-dodeca - 3,7,11 - trienyl)-3-methylcyclopent-2-en-1-ol, according to claim 1, which comprises treating 2-(7,11-dimethyl-trans, trans-dodeca - 3,7,11 - trienyl)-3-methylcyclopent-2-en-1-one with a reducing agent selected from the group consisting of lithium aluminum hydride, lithium tri-t-butoxyaluminum hydride sodium trimethoxyborohydride, the borohydrides of lithium, sodium and potassium, and aluminum lower-alkoxides.

3. dl-3,17-dimethyl-A-nor-D-homoestra-3,16-diene.

4. The process for preparing dl-3,17-dimethyl-A-nor-D-homoestra-3,16-diene, according to claim 3 which comprises treating 2-(7-11-dimethyl-trans, trans-dodeca - 3,7,11-trienyl)-3-methylcyclopent-2-en-1-ol with a srtong acid.

5. The process according to claim 4 where the srtong acid is trifluoroacetic acid.

6. dl-3,17-dimethyl-A-nor-D-homoestr-3-en-17-ol.

7. 1α-(3-oxobutyl)-5β - formylmethyl - 6α - (2-oxopropyl) - 6β - methyl - 3,4,4aβ,5,6,7,8,8aα - octahydro-2(1H)-naphthalenone.

8. The process for preparing 1α - (3-oxobutyl)-5β-formylmethyl - 6α - (2-oxopropyl) - 6β - methyl-3,4,4aβ, 5,6,7,8,8aα - octahydro - 2(1H)-naphthalenone, according to claim 7 which comprises ozonizing dl-3,17-dimethyl-A-nor-D-homoestra-3,16-diene.

9. The process which comprises treating 1α-(3-oxobutyl) - 5β - formylmethyl - 6α - (2-oxopropyl)-6β-methyl-3,4,4aβ,5,6,7,8,8aα - octahydro - 2(1H) - naphthalenone, according to claim 7, with a cyclization catalyst selected from the group consisting of a strong acid, a strong base, an amine and an amine acid-addition salt, thereby obtaining dl-19-norpregna-4,16-diene-3,20-dione.

10. The process according to claim 9 wherein the cyclization catalyst is hydrochloric acid.

11. The process which comprises treating 2-(7,11-dimethyl-trans, trans-dodeca - 3,7,11 - trienyl) - 3-methylcyclopent-2-en-1-one with a reducing agent selected from the group consisting of lithium aluminum hydride, lithium tri-t-butoxyaluminum hydride, sodium trimethoxyborohydride, the borohydrides of lithium, sodium and potassium, and aluminum lower-alkoxides, treating the resulting 2 - (7,11 - dimethyl - trans, trans-dodeca - 3,7,11-trienyl) - 3 - methylcyclopent - 2-en-1-ol, according to claim 1, with a strong acid, azonizing the resulting dl-3,17 - dimethyl-A-nor-D-homoestra-3,16-diene and treating the resulting 1α - (3 - oxobutyl) - 5β-formylmethyl-6α - (2 - oxopropyl) - 6β - methyl - 3,4,4aβ,5,6,7,8,8aα-octahydro-2(1H)-naphthalenone with a cyclization catalyst selected from the group consisting of a strong acid, a strong base, an amine and an amine acid-addition salt, thereby obtaining dl-19-norpregna-4,16-diene-3,20-dione.

No references cited

ELBERT L. ROBERTS, Primary Examiner

U.S. Cl. X.R.

260—397.3, 586, 617, 397.5